JULIUS MEYER.
Basket.
No. 166,215.    Patented Aug. 3, 1875.
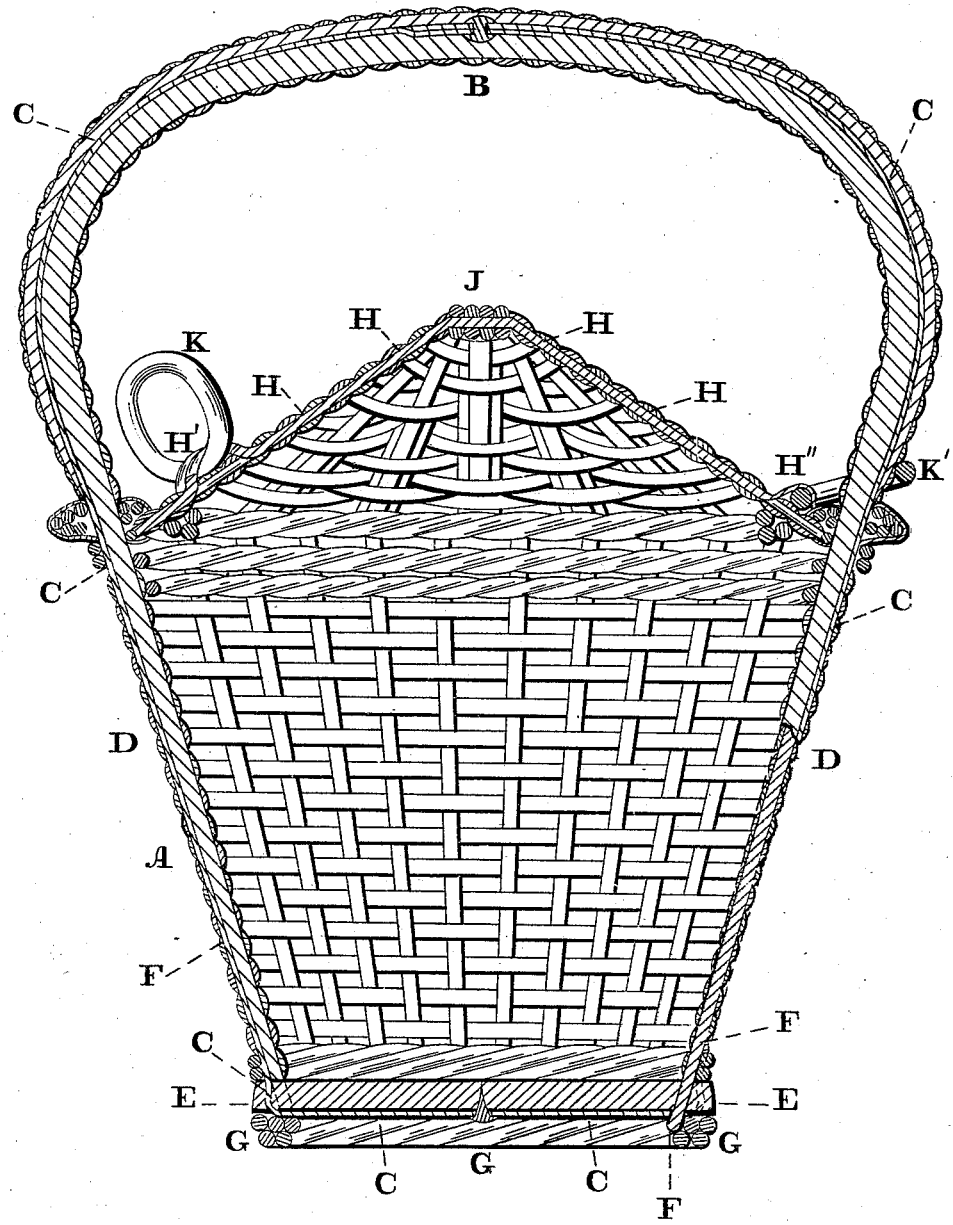

UNITED STATES PATENT OFFICE.

JULIUS MEYER, OF PHILADELPHIA, PENNSYLVANIA.

IMPROVEMENT IN BASKETS.

Specification forming part of Letters Patent No. 166,215, dated August 3, 1875; application filed February 26, 1875.

*To all whom it may concern:*

Be it known that I, JULIUS MEYER, of the city and county of Philadelphia and State of Pennsylvania, have invented a new and useful Improvement in Baskets; and I do hereby declare the following to be a clear and exact description of the nature thereof, sufficient to enable others skilled in the art to which my invention appertains to fully understand, make, and use the same, reference being had to the accompanying drawing making part of this specification, in which the figure is a transverse vertical section of the device embodying my invention, which consists of a bracing extending around the sides, bottom, and handle of the basket. It also consists in a wooden bottom, through which are passed the upright rods or wands, which, locked on the bottom, form the foot or base of the basket, and provide a strong connection between the bottom and body of the basket. It also consists in providing the lid with a bracing-piece, whose ends are continued into loops which constitute firm attachment for the rings of the lid. It further consists in the lid having loops woven therewith and soft-rubber rings connected to said loops, the object and advantages of which will be hereinafter more fully set forth.

Referring to the drawings, A represents the body of the basket, and B the handle thereof. C represents a strip of metal, which is passed around the outside of the sides D and bottom E of the body A, and the handle B and its ends are united so that the strip is continuous.

It will be seen that the connections between the handle and body and the body and bottom of the basket are rendered exceedingly strong and serviceable, and liability to breakage or disengagement is prevented.

The bottom E is constructed of a piece of a board, near whose outer edge is a row of perforations, through which are passed the rods or wands F of the body of the basket. The ends of the rods or wands are then woven or twisted with each other on the under face of the board, and thus there is produced the foot G of the basket, and a firm connection between the body and bottom.

H represents a bracing-piece for the lid J of the basket. This piece has one end secured at one side of the lid, then passed in and out of the lid at that side to form a loop, H', and then continued transversely to the other side of the lid, where it is likewise passed in and out to constitute another loop, H'', and has the adjacent end secured to the lid at the side opposite that from which it started. To one loop, H', there is connected the ring K, by which the lid may be raised, and to the other loop the ring K', by which the lid is connected to the handle B. The lid is thus firmly braced in its transverse direction and prevented from breaking down. The loops H' H'' also securely hold the rings and prevent disengagement thereof from the lid.

The rings K K' are constructed of soft rubber, whereby they may be handled without liability of breakage or cutting of the hands, yield fully when strain is applied to them, and are not thereby torn from their hold on the lid, and the lid may be inverted and carried resting on the body, inside uppermost, without loosening the ring K', and otherwise impairing its efficiency.

Having thus described my invention, what I claim as new, and desire to secure by Letters Patent, is—

1. The combination, with a basket having a handle, of the bracing-strip C extending continuously around the handle, sides, and bottom of the basket, substantially as and for the purpose set forth.

2. The combination, with a basket, of the wooden bottom E, having a series of perforations near its outer edge, and the rods or wands F passing through the perforations and woven below the bottom into the foot G, substantially as and for the purpose set forth.

3. The combination, with the basket-lid J, of the bracing-piece H, extending transversely and formed into ring-engaging loops H' H'', substantially as and for the purpose set forth.

4. The combination, with a basket-lid formed with loops H' H'', of the soft-rubber rings K K', substantially as and for the purpose set forth.

JULIUS MEYER.

Witnesses:
JOHN A. WIEDERSHEIM,
J. W. HAMPTON, Jr.